US00RE44263E

(19) United States
(12) Reissued Patent
Pessech et al.

(10) Patent Number: US RE44,263 E
(45) Date of Reissued Patent: Jun. 4, 2013

(54) EXTENSIBLE BARRIER

(75) Inventors: Ran Pessech, Omer (IL); Ofir Pessach, Gderot (IL)

(73) Assignee: Moseroth Ltd, Netovit (IL)

(21) Appl. No.: 13/118,608

(22) Filed: May 31, 2011

Related U.S. Patent Documents

Reissue of:
(64) Patent No.: 6,682,279
Issued: Jan. 27, 2004
Appl. No.: 10/303,794
Filed: Nov. 26, 2002

(51) Int. Cl.
*B60P 7/08* (2006.01)

(52) U.S. Cl.
USPC ..... 410/36; 410/97; 410/47; 410/50; 410/39; 410/40; 410/42

(58) Field of Classification Search
USPC ..... 410/47, 48, 50, 34, 36, 39, 40, 42, 410/96, 97; 248/68.1; 256/2; 206/394, 443
See application file for complete search history.

(56) References Cited

U.S. PATENT DOCUMENTS

| | | | | |
|---|---|---|---|---|
| 1,921,228 | A * | 8/1933 | Hetherington | |
| 2,355,516 | A * | 8/1944 | Devot | |
| 3,263,830 | A * | 8/1966 | Anderson | 410/36 |
| 4,744,708 | A * | 5/1988 | Cochrane | 410/47 |
| 5,294,222 | A * | 3/1994 | Smith | 410/36 |
| 5,516,244 | A * | 5/1996 | Baka | 410/36 |
| 6,164,883 | A * | 12/2000 | Wilcox | 410/36 |
| 6,250,860 | B1 * | 6/2001 | Hornady | 410/47 |
| 6,261,037 | B1 * | 7/2001 | Richards et al. | 410/36 |
| 6,682,279 | B2 * | 1/2004 | Pessach et al. | 410/36 |

* cited by examiner

*Primary Examiner* — Stephen Gordon
(74) *Attorney, Agent, or Firm* — Mark M. Friedman

(57) ABSTRACT

A barrier including a number of coils, and an inter-coil connector connecting two of the coils. Each of the coils is axially extensible, the coils are in substantially mutually parallel alignment, and each of the coils is in substantial direct contact with another one of the coils.

25 Claims, 4 Drawing Sheets

141

10

EXTENSIBLE BARRIER

Matter enclosed in heavy brackets [ ] appears in the original patent but forms no part of this reissue specification; matter printed in italics indicates the additions made by reissue.

FIELD AND BACKGROUND OF THE INVENTION

The present invention relates to barriers and, in particular, it concerns barriers that are easily and quickly erected and offer high security features.

Of most relevance to the present invention is a barrier described in U.S. Pat. No. 4,744,708 to Cochraine, wherein the barrier is extensibly deployed from a vehicle, and which includes at least three coils of barbed tape supported and spaced from one another with an upper coil located above two lower coils. The coils are spaced apart parallel to one another, and are supported by transverse rods located along the respective lengths of the coils.

A shortcoming of the aforementioned system is due to the barrier structure being connected and supported using transverse rods. This makes the structure relatively expensive and time consuming to produce. The weight of the rods also adds additional compressional stress to the structure that may limit the height of the structure. In addition, the rods may limit transportability due to their weight as well as reducing compressibility of the coils due to their bulk.

A further shortcoming of the aforementioned system is that the barrier is essentially supported along the axis of the coils by the tension of the coils themselves. This can lead to a weakening of the entire structure.

Another shortcoming of the aforementioned system is that the barrier is not anchored to the ground. Although this means that the barrier can be removed quickly by the installers, it also means that security is compromised when the barrier is in use.

A further shortcoming of the aforementioned system is the non-inclusion of additional security detection features.

There is therefore a need for a barrier, which is easy and cheap to construct easy to deploy, robust and provides high security features such as anchoring and security detection.

SUMMARY OF THE INVENTION

The present invention is a barrier construction and method of deployment thereof.

According to the teachings of the present invention there is provided a barrier comprising: (a) a plurality of coils; each of the coils being axially extensible; the coils being in substantially mutually parallel alignment; and each of the coils being in substantial direct contact with another of the coils; and (b) an inter-coil connector connecting two of the coils.

According to a further feature of the present invention the coils form a multi-layered structure, where the coils comprising a first coil disposed in a lower layer of the structure, and a second coil disposed in an upper layer thereof, the first coil at least partially supporting the second coil.

According to a further feature of the present invention the multi-layered structure comprises three layers, wherein: (a) a bottom layer comprising three of the coils; (b) a middle layer comprising two of the coils where each of the therein rests on two of the coils of the bottom layer; and (c) a top layer comprising one of the coils where the one coil of the top layer rests upon the two coils of the middle layer.

According to a further feature of the present invention a portion of the coils comprises barbs.

According to a further feature of the present invention there is also provided a winding connector that connects adjacent loops of one of the coils.

According to a further feature of the present invention the inter-coil connector attaches to adjacent loops of one of the coils.

According to a further feature of the present invention there is also provided a restraining element that is affixed to one of the coils.

According to a further feature of the present invention the restraining element is affixed to the one coil at a plurality of locations thereon.

According to a further feature of the present invention there is also provided a restraining connector, wherein the restraining connector connects the restraining element to adjacent loops of the one coil.

According to a further feature of the present invention there is also provided a restraining element wherein the winding connector connects the restraining element to the adjacent loops of the one coil.

According to a further feature of the present invention there is also provided a restraining element wherein the inter-coil connector connects the restraining element to adjacent loops of one of the coils.

According to a further feature of the present invention there is also provided a first restraining peg connected to a first end of the restraining element, and a second restraining peg connected to a second end thereof.

According to a further feature of the present invention the restraining element is a cable.

According to a further feature of the present invention the restraining element comprises a first restraining element and a second restraining element, the first restraining element and the second restraining element being affixed to the coils on opposing outer sides of a bottom layer of the barrier.

According to a further feature of the present invention there is also provided an anchoring member that passes through one of the coils.

According to a further feature of the present invention the anchoring member passes through the one coil and the one coil is disposed in a bottom layer of the barrier.

According to a further feature of the present invention the anchoring member is a cable.

According to a further feature of the present invention there is also provided a first anchoring peg connected to a first end of the anchoring member, and a second anchoring peg connected to a second end thereof.

According to a further feature of the present invention there is provided a security detection element that is aligned substantially parallel to windings of one of the coils.

According to a further feature of the present invention the security detection element is flexible.

According to a further feature of the present invention the security detection element is an optical communications element.

According to a further feature of the present invention the security detection element is an insulated electrical conductor.

According to a further feature of the present invention there is provided an outer core that surrounds the security detection element.

According to a further feature of the present invention the outer core forms a body of the windings of the one coil.

According to a further feature of the present invention the outer core is formed from twisted wires.

There is also provided according to the teachings of the present invention a method for constructing a barrier comprising the steps of: (a) disposing a plurality of coils in a substantially mutually parallel alignment in proximity to one another; (b) inter-connecting two of the coils; (e) axially extending the coils to form an extended barrier; and (d) securing the extended barrier to a substrate.

According to a further feature of the present invention the step of disposing the coils is performed by: (a) arranging the coils in a multi-layered structure, where the coils comprise a first coil disposed in a lower layer of the structure, and a second coil disposed in an upper layer thereof; and (b) supporting the second coil by the first coil.

According to a further feature of the present invention the step of arranging the coils in the multi-layered structure is performed by: (a) arranging three of the coils in a bottom layer; (b) arranging two of the coils in a middle layer (c) resting each of the two coils on to of the three coils; and (d) resting one of the coils upon the two coils to define a top layer.

According to a further feature of the present invention there is also provided the step of: after performing the step of interconnecting two of the coils attaching a restraining element to one of the coils.

According to a further feature of the present invention there is also provided the step of: prior to performing the step of axially extending the coils, securing the restraining element with a restraining peg to the substrate.

According to a further feature of the present invention there is also provided the step of: after performing the step of inter-connecting two of the coils, passing an anchoring member through one of the coils.

According to a further feature of the present invention there is also provided the step of: prior to performing the step of axially extending the coils, securing the anchoring member with an anchoring peg to the substrate.

According to a further feature of the present invention the step of axially extending the coils is performed by a mode of conveyance.

According to a further feature of the present invention the step of axially extending the coils further comprises the step of supporting one of the coils on an elongated support.

According to a further feature of the present invention the step of securing the extended barrier to the substrate is performed by securing the restraining element with a restraining peg to the substrate.

According to a further feature of the present invention the step of securing the extended barrier to the substrate is performed by securing the anchoring member with an anchoring peg to the substrate.

According to a further feature of the present invention the step of securing the extended barrier to the substrate is performed by securing the anchoring member with an anchoring peg to the substrate at a plurality of locations.

There is also provided according to the teachings of the present invention a wire for use in constricting barriers comprising: (a) a security detection element; (b) an outer core, wherein the security detection element is surrounded by the outer core; and (c) a plurality of barbs, wherein at least a portion of the outer core has the barbs attached thereon.

According to a further feature of the present invention the security detection element is flexible.

According to a further feature of the present invention the security detection element is an optical communications element.

According to a further feature of the present invention the security detection element is an insulated electrical conductor According to a further feature of the present invention the outer core is formed from twisted wires.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a barrier construction and method of deployment thereof.

The principles and operation of the barrier according to the present invention may be better understood with reference to the drawings and the accompanying description.

Figure 1:
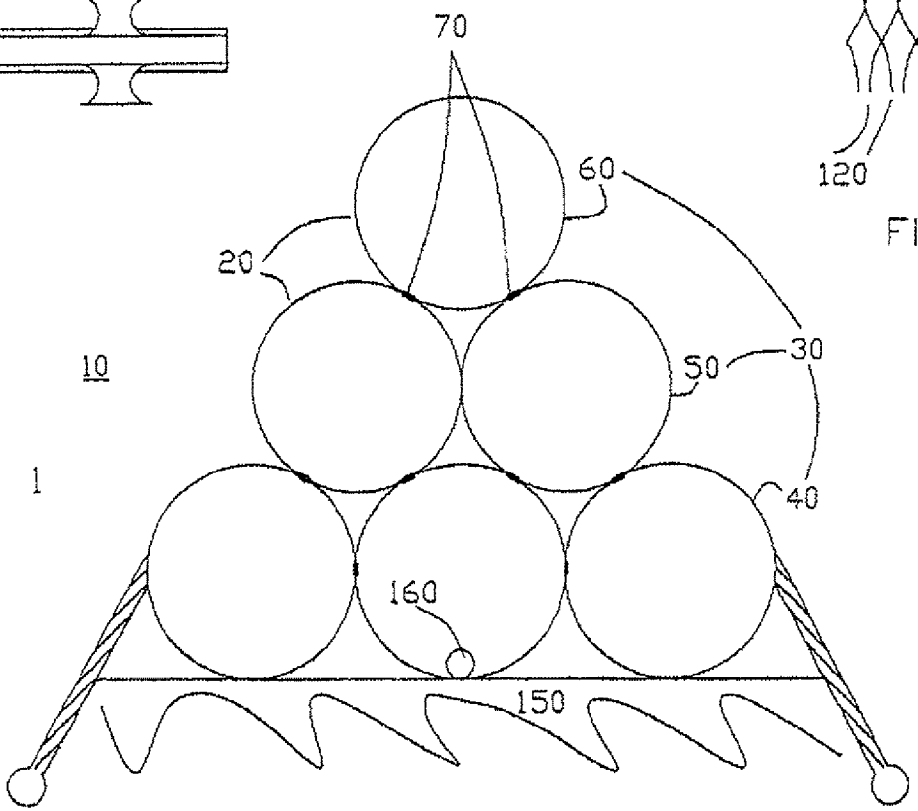
FIG. 1 is a transverse sectional view of a barrier that is constructed and operable in accordance with a preferred embodiment of the invention.

Reference is now made to FIG. 1, which is a transverse sectional view of the barrier 10 that is constructed and operable in accordance with a preferred embodiment of the invention. The barrier 10 is composed of six coils 20 that are each axially extensible. The preferred diameter of the coils is within the range 45 cm to 150 cm. The coils 20 are disposed so that they are in substantially mutually parallel alignment and each coil 20 is in substantially direct contact with adjacent coils 20. The coils 20 are disposed to form a multi-layered structure 30 composed of three layers 40, 50, 60; a bottom layer 40 composed of three coils 20 and a middle layer 50 composed of two coils 20 and a top layer 60 composed of one coil 20. The coil 20 of the top layer 60 is supported by the two coils 20 of the middle layer 50 and the two coils 20 of the middle layer 50 are each supported by two coils 20 of the bottom layer 40. Inter-coil connectors 70 connect adjacent coils 20 at a plurality of points along the coils 20 where the coils meet tangentially. The inter-coil connectors 70 preferably connect adjacent coils 20 at every winding (not shown) of the coils 20 where the coils 20 meet tangentially. The inter-coil connectors 70 are typically metal clips or steel wire.

The term substantially direct contact stated above is defined as meaning that there is no significant spacing between the coils 20 due to the introduction of the inter-coil connectors 70. Contact between the coils 20 is not in itself essential, but substantially direct contact enables the use of more cost-effective inter-coil connectors 70, cheaper and quicker construction and provides a more secure structure for the barrier 10.

Figure 2:
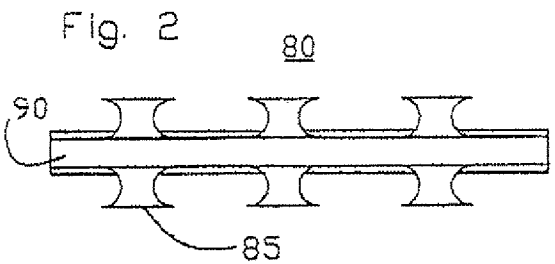
FIG. 2 is a longitudinal sectional view of a barbed cable used in the barrier of FIG. 1.

Reference is now made to FIG. 2, which is a longitudinal sectional view of a barbed wire 80 used in the barrier 10 that is constructed and operable in accordance with a preferred embodiment of the invention. Galvanized barbs 85 are clipped around a wire 90 before the barbed wire 80 is formed into the coil 20. The preferred width of the barbed wire 80 is within the range 10 mm to 30 mm. The preferred distance between the center of each barb is 25.4 mm, according to industry standards.

Figure 3:
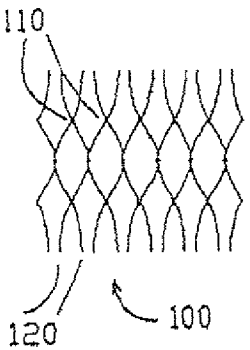
FIG. 3 is an enlarged partial view of an expanded coil that is used in the barrier of FIG. 1.

Reference is now made to FIG. 3, which is an enlarged partial view 100 of an expanded coil 20 that is constructed and operable in accordance with a preferred embodiment of the invention. Adjacent loops 120 of the coils 20 are connected using winding connectors 110. Typically five winding connectors 110 are used in one loop 120 of the coil 20. The winding connectors 110 are typically metal clips with a preferred thickness within the range 1 mm to 2 mm. The use of the winding connectors 110 results in an expanded coil 20, which displays a lattice, effect as shown in FIG. 3. The lattice effect results in a denser barrier that can enhance security.

Figure 4:
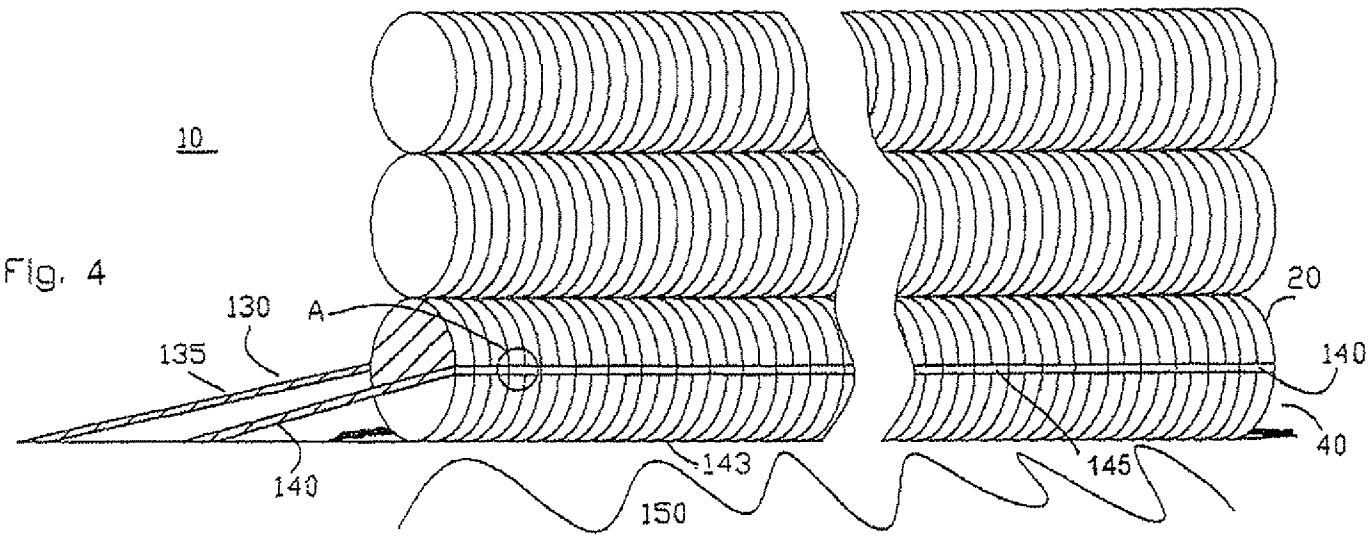
FIG. 4 is a perspective view of the barrier shown in FIG. 1.

Reference is now made to FIG. 4, which is a perspective view of the barrier 10 that is constricted and operable in accordance with a preferred embodiment of the invention. A restraining element 130 is composed of a first restraining element 135 and a second restraining element 140. The securing of the restraining element 130 and its purpose within the barrier 10 construction is explained in farther detail in reference to FIG. 9.

Figure 5:
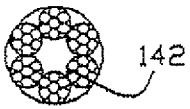
FIG. 5 is a transverse sectional view of a cable used in the barrier of FIG. 1.

Reference is now made to FIG. 5, which is a transverse sectional view of a cable 141 that is constructed and operable in accordance with a preferred embodiment of the invention. Each restraining element 130 is typically formed of the cable 141. The cable 141 is composed of six twisted strands 142. The six twisted strands 142 are typically made of tensile steel. The preferred diameter of the cable 141 is within the range 4 mm to 8 mm.

Reference is again made to FIG. 4. The first restraining element 135 and the second restraining element 140 are each affixed to the coils 20 on opposing outer sides of the bottom layer 40 of the barrier 10. The preferred positioning of the restraining element 130 is approximately at a height from a base 143 of the barrier 10 equal to between 30% and 50% of the diameter of one coil 20. A reason for the preferred positioning of the restraining element 130 is to prevent the restraining element 130 from damaging the barrier 10 when the barrier 10 is attached to a substrate 150. The restraining clement 130 is affixed to alternate loops 120 of the coil 20 using restraining clips 145. The restraining clips 145 are typically wire rope clips or steel staples. A pneumatic staple gun (not shown) typically dispenses the steel staples.

Figure 6:
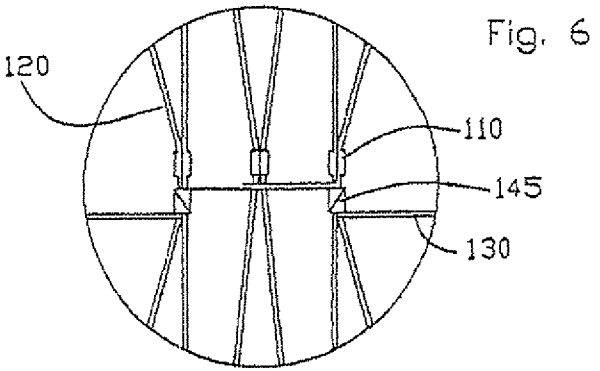
FIG. 6 is an enlarged view of the region indicated by the letter A in FIG. 4.

Reference is now made to FIG. 6, which is an enlarged view of the region indicated by a letter A in FIG. 4 showing the attachment of the restraining element 130 to the coil 20. The restraining element 130 is affixed to alternate loops 120 using restraining clips 145 at a position on the loops 120 adjacent to winding connectors 110. Each restraining clip 145 thereby affixes the restraining element 130 to two loops 120. The length of the restraining element 130 between two of the restraining clips 145 is dimensioned to prevent the expanded coil 20 from being over-stretched and to ensure that the expanded coil 20 is expanded to the optimal expansion required. The restraining element 130 extends from each end of the coil 20 to facilitate attachment of an end of the restraining element 130 to the substrate 150. The substrate is typically a base or the ground. Typically, the restraining element 130 is positioned to prevent the expanded coil 20 from attaining more than between 50% and 90% (most preferred two thirds) of its fully expanded length. The fully expanded length is defined as the maximum extension of the barrier 10 without risking damage to the barrier 10.

Reference is again made to FIG. 1. An anchoring member 160 passes through a middle coil 20 of the bottom layer 40 of the barrier 10. The securing of the anchoring member 160 and its purpose within the barrier 10 construction is explained in further detail in reference to FIG. 9. The anchoring member 160 is typically formed of twisted metal cable with a preferred diameter within the range 6 mm to 12 mm. The anchoring member 160 extends from each end of the coil 20 to facilitate attachment of an end of the anchoring member 160 to the substrate 150.

Figure 7:
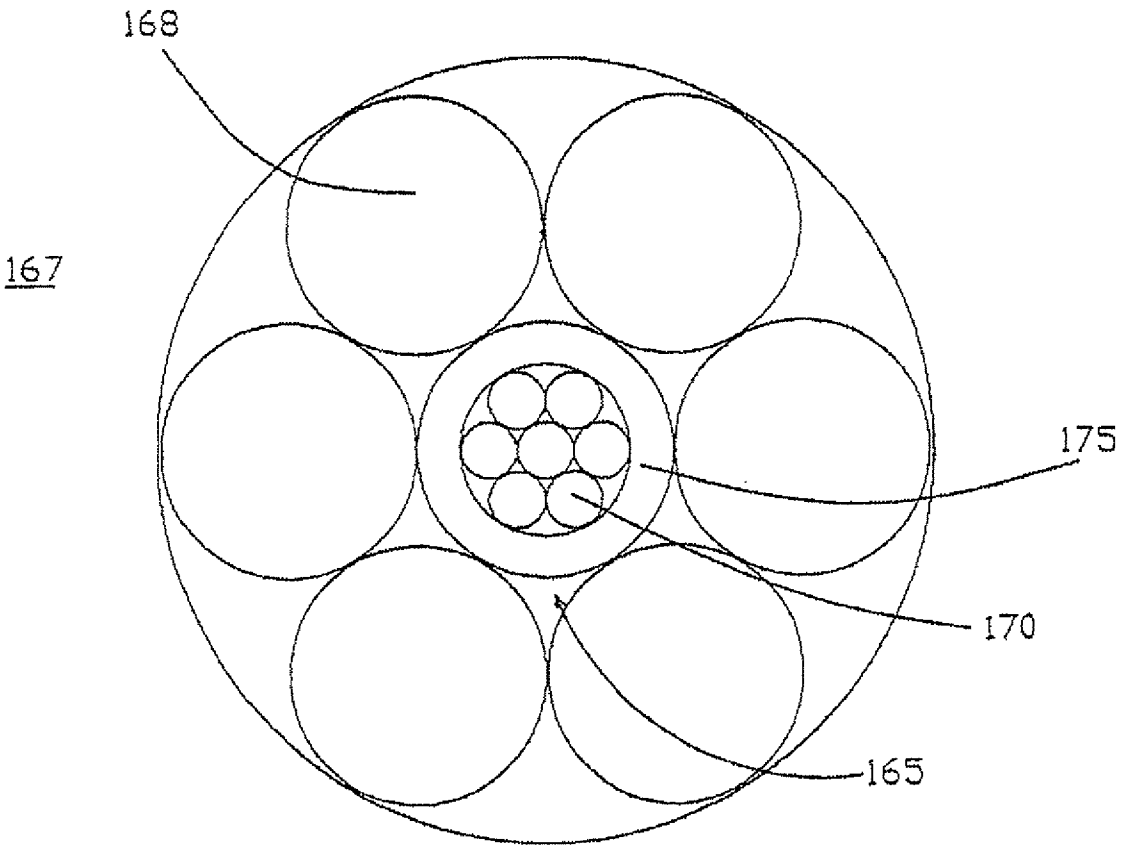
FIG. 7 is a transverse sectional view of a security detection element installed within a cable for use in the barrier of FIG. 1.

Reference is now made to FIG. 7, which is a transverse sectional view of a security detection element 165 installed within a cable 167 for use in the barrier 10 that is constructed and operable in accordance with a preferred embodiment of the invention. The security detection element 165 can be installed in one or more of the coils 20 to detection intrusion when the security detection clement 165 is severed. Typically it is sufficient to install the security detection element 165 in one of the coils 20. According to a most preferred embodiment of the invention the security element 165 is installed in the coil 20 of the top layer 60 of the barrier 10 (FIG. 1). The cable 167 forms the body of the windings 120 of the coils 20. The cable 167 is typically composed of six twisted wires 168. The security detection element 165 can be an electrical conductor 170 surrounded by an insulating sheath 175. The security detection element 165 can also be realized as an optical communications element (not shown).

Figure 8:
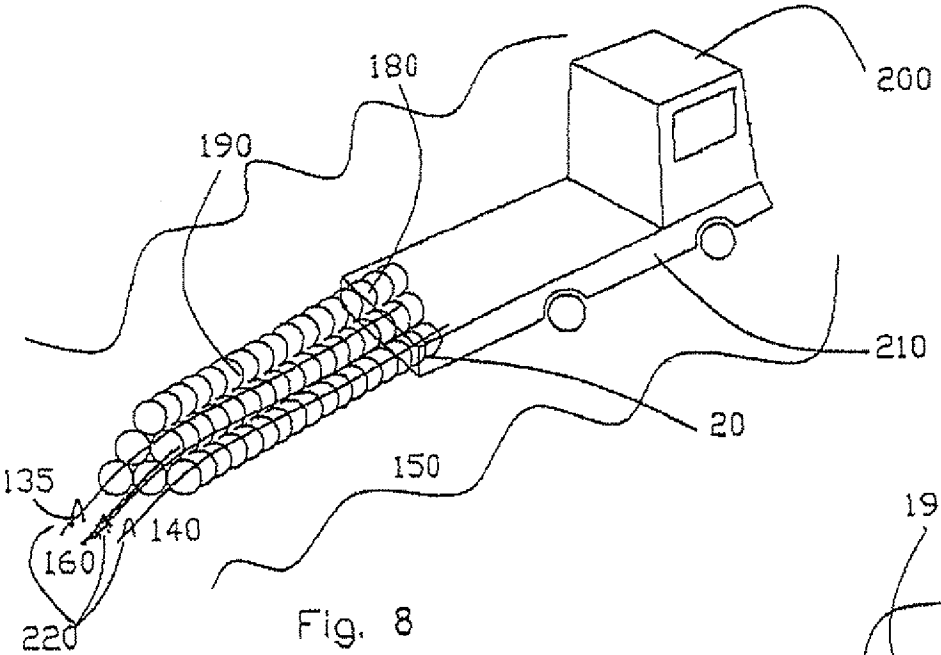
FIG. 8 is a perspective view of the barrier during deployment in accordance with a preferred embodiment of the invention.

Reference is now made to FIG. 8, which is a perspective view of the barrier 10 during deployment in accordance with a preferred embodiment of the invention. Prior to deployment, the barrier 10 is compressed longitudinally to form a compressed barrier 180. The compressed barrier 180 is placed on a vehicle 200 with the axis of the coils 20 being substantially parallel to the sides 210 of the vehicle 200. The compressed barrier 180 is supported on the vehicle 200 using a support element (not shown). A suitable vehicle and support element for the vehicle 200 and the support element (not shown) are disclosed in the above-noted U.S. Pat. No. 4,794,708. A portion of the compressed barrier [130] *180* is removed from the back of the vehicle 200 and it is extended to form an extended barrier 190. The ends of the restraining elements 135, 140 that extend from the end of the extended barrier 190, are secured to the substrate 150 using pegs 220. The end of the anchoring member 160 that extends from the end of the extended barrier 190, is secured to the substrate 150 using one of the pegs 220. The remaining portion of the compressed barrier 180 is extended by driving the vehicle 200 in a direction away from the extended barrier 190.

Figure 9:
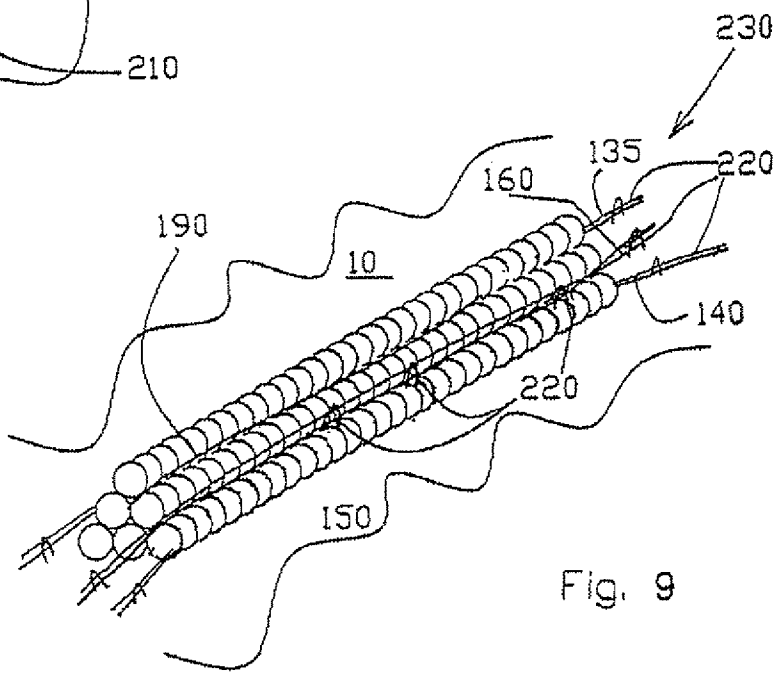
FIG. 9 is a perspective view of a barrier secured to a substrate in accordance with a preferred embodiment of the invention.

Reference is now made to FIG. 9, which is a perspective view of a barrier secured to a substrate in accordance with a preferred embodiment of the invention. The unsecured end 230 of the extended barrier 190 is partly secured by pulling taut the restraining [element] *elements* 135, 140 in an opposing direction substantially parallel to the extended barrier 190. The taut restraining [element] *elements* 135, 140 [is] *are* secured to the substrate 150 using the peg 220. The secured restraining [element] *elements* 135, 140 [supports] *support* the extended barrier 190 ensuring that the tensile stress of the barrier 10 is mainly borne by the restraining [element] *elements* 135, 140. If the extended barrier 190 becomes dislodged from its position or disfigured, the restraining [element] *elements* 135, 140 can also be used to reposition or reinstate the extended barrier 190. The unsecured end 230 of the extended barrier 190 is further secured by pulling taut the anchoring member 160 in an opposing direction substantially parallel to the extended barrier 190. The taut anchoring member 160 is secured to the substrate 150 using one of the pegs 220. The secured anchoring member 160 helps prevent vertical and transverse movement of the extended barrier 190.

In accordance with the most preferred embodiment of the invention, the anchoring member 160 can be further secured to the substrate 150 it one or more locations along the length of the anchoring member 160 using one of the pegs 220. Most preferably, the pegs 220 are spaced apart within the range 3 to 7 meters, although the spacing may be significantly greater than this depending upon the terrain and the level of security required. This further securing of the anchoring member 160 further prevents vertical and transverse movement of the extended barrier 190.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. [A] *An extensible* barrier *in an axially compressed state for deployment from a vehicle, the barrier* comprising:

(a) a plurality of coils, (i) each of said coils being axially extensible, (ii) said coils being in substantially mutually parallel alignment, and (iii) each of said coils being *adjacent to, and* in substantial direct contact with, another of said coils; and (b) an inter-coil connector connecting two of said coils, *wherein said plurality of coils are axially compressed and supported so as to allow progressive deployment of the extensible barrier from a moving vehicle.*

2. The barrier according to claim 1 wherein said coils form a multi-layered structure, said coils comprising a first coil disposed in a lower layer of said structure, and a second coil disposed in an upper layer thereof, said first coil at least partially supporting said second coil.

3. The barrier according to claim 1 wherein said coils form a multi-layered structure having a bottom layer, a middle layer and a top layer, wherein:

(a) said bottom layer includes three of said coils;

(b) said middle layer includes two of said coils, each of said two coils of said middle layer rests on two of said coils of said bottom layer; and (c) said top layer includes one of said coils, said one coil of said top layer rests upon said two coils of said middle layer.

4. The barrier according to claim 1 wherein a portion of said coils comprises barbs.

5. The barrier according to claim 1 further comprising a winding connector that connects adjacent loops of one of said coils.

6. The barrier according to claim 1, wherein said inter-coil connector attaches to adjacent loops of one of said coils.

7. The barrier according to claim 1 further comprising a restraining element that is affixed to one of said coils.

8. The barrier according to claim 7 wherein said restraining element is affixed to said one coil at a plurality of locations thereon.

9. The barrier according to claim 7 further comprising a restraining connector, wherein said restraining connector connects said restraining element to adjacent loops of said one coil.

10. The barrier according to claim 5 further comprising a restraining element wherein said winding connector connects said restraining element to said adjacent loops of said one coil.

11. The barrier according to claim 1 further comprising a restraining element wherein said inter-coil connector connects said restraining element to adjacent loops of one of said coils.

12. The barrier according to claim 7 further comprising a first restraining peg connected to a first end of said restraining element, and a second restraining peg connected to a second end thereof.

13. The barrier according to claim 7 wherein said restraining element is a cable.

14. The barrier according to claim 7 wherein said restraining element comprises a first restraining element and a second restraining element, said first restraining element and said second restraining element being affixed to said coils on opposing outer sides of a bottom layer of said barrier.

15. The barrier according to claim 1 further comprising an anchoring member that passes through one of said coils.

16. The barrier according to claim 15 wherein said anchoring member passes through said one coil and said one coil is disposed in a bottom layer of said barrier.

17. The barrier according to claim 15 wherein said anchoring member is a cable.

18. The barrier according to claim 15 further comprising a first anchoring peg connected to a first end of said anchoring member, and a second anchoring peg connected to a second end thereof.

19. The barrier according to claim 1 further comprising a security detection element that is aligned substantially parallel to windings of one of said coils.

20. The barrier according to claim 19 wherein said security detection element is flexible.

21. The barrier according to claim 19 wherein said security detection element is an optical communications element.

22. The barrier according to claim 19 wherein said security detection element is an insulated electrical conductor.

23. The barrier according to claim 19 further comprising an outer core that surrounds said security detection element.

24. The barrier according to claim 23 wherein said outer core forms a body of said windings of said one coil.

25. The barrier according to claim 24 wherein said outer core is formed from twisted wires.

* * * * *

UNITED STATES PATENT AND TRADEMARK OFFICE

CERTIFICATE OF CORRECTION

PATENT NO. : RE44,263 E
APPLICATION NO. : 13/118608
DATED : June 4, 2013
INVENTOR(S) : Pessach et al.

It is certified that error appears in the above-identified patent and that said Letters Patent is hereby corrected as shown below:

On the Title Page: should be corrected as follows:
Change:
(12) "Reissued Patent
Pessech et al."
to
"Reissued Patent
Pessach et al."

(75) Inventors: should be corrected as follows:
Change:
--Ran Pessech--
to
"Ran Pessach"

Signed and Sealed this
Twenty-third Day of July, 2013

Teresa Stanek Rea
*Acting Director of the United States Patent and Trademark Office*